US00RE49846E

(19) United States
(12) Reissued Patent
Shapson et al.

(10) Patent Number: US RE49,846 E
(45) Date of Reissued Patent: Feb. 20, 2024

(54) MOCA GATEWAY SPLITTER

(71) Applicant: TIMES FIBER COMMUNICATIONS, INC., Wallingford, CT (US)

(72) Inventors: Brian J. Shapson, Millstone Township, NJ (US); Jay Shapson, Millstone Township, NJ (US); Matthew M. Shapson, Robbinsville, NJ (US); Robert L. Romerein, Peterborough (CA); Rong H. Li, Brooklyn, NY (US); Daniel Deutmeyer, Manchester, TN (US)

(73) Assignee: Times Fiber Communications, Inc., Wallingford, CT (US)

(21) Appl. No.: 15/993,413

(22) Filed: May 30, 2018

Related U.S. Patent Documents

Reissue of:
(64) Patent No.: 9,356,796
Issued: May 31, 2016
Appl. No.: 14/120,054
Filed: Apr. 21, 2014

U.S. Applications:
(63) Continuation of application No. 13/868,261, filed on Apr. 23, 2013, now Pat. No. 8,752,114.

(51) Int. Cl.
*H04L 12/28* (2006.01)
*H04N 7/10* (2006.01)
(Continued)

(52) U.S. Cl.
CPC ..... *H04L 12/2838* (2013.01); *H04L 12/2801* (2013.01); *H04N 7/106* (2013.01);
(Continued)

(58) Field of Classification Search
CPC ..... H04L 12/2838; H04L 12/2801; H04N 21/43615; H04N 21/04; H04N 21/26;
(Continued)

(56) References Cited

U.S. PATENT DOCUMENTS 3,717,813 A * 2/1973 Lieberman ..... H04N 7/102 348/E7.052
4,586,104 A * 4/1986 Standler ..... H02H 9/06 361/119

(Continued)

OTHER PUBLICATIONS

Capacitor. (2001). In F. Hargrave, Hargrave's Communications Dictionary, Wiley. Wiley. Credo Reference: https://search.credoreference.com/content/entry/hargravecomms/capacitor/0?institutionId=743 (Year: 2001).*

(Continued)

*Primary Examiner* — Karin Reichle
(74) *Attorney, Agent, or Firm* — Wolf, Greenfield & Sacks, P.C.

(57) ABSTRACT

A CATV/MoCA (*cable television/Multimedia over Coax Alliance*) signal distribution system includes a first 2-way hybrid splitter for receiving a CATV input signal and splitting it into first and second CATV output signals, a second 2-way hybrid splitter for receiving the second CATV output signal and splitting it into third and fourth CATV output signals, with the latter being connected to a CATV output port. A first diplex filter is receptive of the first CATV output signal, and MoCA signals for providing electrical isolation therebetween and connecting them to a modem port. A second diplex filter is receptive of the third CATV output signal and MoCA signals for providing electrical isolation therebetween and connecting them to a Gateway port. A resistive splitter is connected between the first and second diplex filters and a plurality of individual MoCA signal ports for providing bidirectional MoCA signal flow therebetween.

24 Claims, 7 Drawing Sheets

(51) Int. Cl.

| | |
|---|---|
| ***H04N 7/173*** | (2011.01) |
| ***H04N 21/426*** | (2011.01) |
| ***H04N 21/436*** | (2011.01) |
| ***H04N 21/472*** | (2011.01) |
| ***H04N 21/61*** | (2011.01) |
| ***H04N 21/643*** | (2011.01) |

(52) U.S. Cl.
CPC ..... *H04N 7/17309* (2013.01); *H04N 21/426* (2013.01); *H04N 21/43615* (2013.01); *H04N 21/47214* (2013.01); *H04N 21/6118* (2013.01); *H04N 21/6168* (2013.01); *H04N 21/643* (2013.01)

(58) Field of Classification Search
CPC ..... H04N 21/47214; H04N 21/616; H04N 21/6118; H04N 7/106; H04N 7/17309
See application file for complete search history.

(56) References Cited

U.S. PATENT DOCUMENTS 5,122,921 A * 6/1992 Koss ..... H02H 9/005 361/111
5,216,569 A * 6/1993 Brookhiser ..... H01Q 1/50 361/107
5,682,426 A 10/1997 Miliani et al.
5,883,597 A 3/1999 DeWulf
5,896,265 A * 4/1999 Glaser ..... H01Q 1/50 361/111
6,751,081 B1 * 6/2004 Kooiman ..... H01P 1/266 361/119
7,082,022 B2 * 7/2006 Bishop ..... H02H 9/06 361/119
7,430,103 B2 * 9/2008 Kato ..... H01L 24/40 361/56
7,592,883 B2 * 9/2009 Shafer ..... H03H 7/0115 333/132
8,081,427 B2 * 12/2011 Riggsby et al. ..... 361/679.01
8,174,999 B2 5/2012 Kliger et al.
8,286,209 B2 10/2012 Egan, Jr. et al.
8,345,550 B2 1/2013 Laudel et al.
8,356,322 B2 1/2013 Wells et al.
8,397,271 B2 * 3/2013 Riggsby ..... H04N 7/102 725/143
8,429,695 B2 4/2013 Halik et al.
8,462,479 B2 * 6/2013 Alkan ..... H03H 7/461 361/119
8,479,247 B2 7/2013 Shafer
8,510,782 B2 8/2013 Wells et al.
8,589,997 B2 11/2013 Wells
8,752,114 B1 * 6/2014 Shapson ..... H04N 7/104 725/126
9,167,286 B2 10/2015 Wells et al.
9,351,051 B2 5/2016 Wells et al.
9,356,796 B2 5/2016 Shapson et al.
9,516,376 B2 12/2016 Wells et al.
9,647,851 B2 5/2017 Newby et al.
9,781,472 B2 10/2017 Wells et al.
9,860,591 B2 1/2018 Wells et al.
10,045,056 B2 8/2018 Newby et al.
10,154,302 B2 12/2018 Wells et al.
10,341,718 B2 7/2019 Wells et al.
2002/0073434 A1 * 6/2002 Pience ..... H04L 12/2801 725/119
2002/0166124 A1 * 11/2002 Gurantz ..... H04N 21/615 725/78
2003/0066082 A1 * 4/2003 Kliger ..... H04L 12/2801 725/80
2003/0072121 A1 * 4/2003 Bartel ..... H01Q 1/50 361/119
2003/0192063 A1 * 10/2003 Runkle ..... H04N 7/104 725/149
2005/0034167 A1 2/2005 Weinstein et al.
2005/0047051 A1 * 3/2005 Marland ..... H02H 9/005 361/119
2006/0279379 A1 * 12/2006 Gale ..... H01R 24/547 333/131
2008/0120667 A1 * 5/2008 Zaltsman ..... 725/110
2008/0157898 A1 * 7/2008 Palinkas ..... H03H 7/06 333/110
2008/0224798 A1 * 9/2008 Shafer ..... H01P 1/22 333/132
2009/0031384 A1 1/2009 Brooks et al.
2009/0077608 A1 3/2009 Romerein et al.
2009/0165070 A1 6/2009 McMullin et al.
2009/0320086 A1 12/2009 Rijssemus et al.
2010/0043032 A1 * 2/2010 Tsao ..... H04N 7/102 725/85
2010/0125877 A1 5/2010 Wells et al.
2010/0146564 A1 6/2010 Halik et al.
2010/0162340 A1 6/2010 Riggsby
2010/0235869 A1 * 9/2010 Zhao et al. ..... 725/82
2011/0002245 A1 * 1/2011 Wall et al. ..... 370/297
2011/0010749 A1 * 1/2011 Alkan ..... 725/127
2011/0072472 A1 3/2011 Wells et al.
2011/0113455 A1 * 5/2011 Wu ..... 725/82
2011/0138064 A1 * 6/2011 Rieger et al. ..... 709/228
2011/0181371 A1 * 7/2011 Alkan ..... H04L 12/2838 333/132
2011/0279943 A1 * 11/2011 Penwell ..... H01P 1/20 361/118
2011/0292557 A1 * 12/2011 Penwell ..... H01R 24/48 361/118
2012/0042345 A1 * 2/2012 Tjio et al. ..... 725/63
2012/0054805 A1 * 3/2012 Shafer ..... H04L 12/2801 725/78
2012/0054819 A1 * 3/2012 Alkan ..... H04L 12/2838 725/153
2012/0159556 A1 * 6/2012 Alkan ..... 725/80
2012/0331501 A1 * 12/2012 Shafer ..... H03H 7/075 725/27
2013/0002958 A1 * 1/2013 Labro ..... H04N 7/104 348/584
2013/0081096 A1 * 3/2013 Wells ..... H04N 7/102 725/120
2013/0091267 A1 * 4/2013 Urban et al. ..... 709/224
2013/0091533 A1 4/2013 Wells et al.
2013/0100571 A1 * 4/2013 Alkan ..... H01T 4/10 29/869
2013/0111539 A1 * 5/2013 Egan ..... H04N 7/106 725/151
2013/0125193 A1 5/2013 Wells
2013/0181789 A1 7/2013 Rijssemus
2013/0212615 A1 * 8/2013 Schultz ..... 725/25
2013/0227632 A1 8/2013 Wells et al.
2013/0279914 A1 * 10/2013 Brooks ..... H04Q 11/0067 398/66
2013/0283334 A1 * 10/2013 Tsao ..... H04N 21/6118 725/149
2013/0291029 A1 10/2013 Wells
2014/0105221 A1 * 4/2014 Bailey ..... H04L 12/2801 370/420
2016/0094890 A9 3/2016 Shapson et al.
2018/0027287 A1 1/2018 Wells et al.
2018/0152753 A1 5/2018 Wells et al.
2018/0152754 A1 * 5/2018 Wells ..... H04N 7/104
2018/0152755 A1 5/2018 Wells et al.
2018/0152756 A1 5/2018 Wells et al.
2018/0160170 A1 6/2018 Wells et al.
2018/0160171 A1 6/2018 Wells et al.
2018/0160172 A1 * 6/2018 Wells ..... H04N 21/63
2018/0167668 A1 6/2018 Wells et al.
2018/0167669 A1 6/2018 Wells et al.

OTHER PUBLICATIONS

[No Author Listed] Surge Arrester: 2-Electrode Arrester. EPCOS AG. Dec. 16, 2011;8:1-4.

[No Author Listed] Surge Protection Made Simple™ for wind power applications: IEC class I coordinated lightning current arrest-

(56) References Cited

OTHER PUBLICATIONS ers with high follow current from 400-690 volt, TNC, TNS & IT systems. Cooper Bussmann. www.cooperbussmann.com/Surge. Jul. 2011:1-2.
Leung et al., Multilayer LTCC bandpass filter design with enhanced stopband characteristics. IEEE Microwave and Wireless Components Letters. Jul. 2002;12(7):240-2.
Martzloff, A Standard for the 90s: IEEE C62.41 Surges Ahead. Compliance Engineering, Sep. 1, 1991;5:27-32.
Meppelink et al., Lightning Arresters with Spark Gaps. Requirements and Future Trends of Development and Application. 2000:660-5.

* cited by examiner

MOCA GATEWAY SPLITTER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATION

The present Application *is a reissue of U.S. Pat. No. 9,356,796, granted May 31, 2016, which was filed on Apr. 21, 2014 as U.S. application Ser. No. 14/120,054, which* is a Continuation Application from co-pending application Ser. No. 13/868,261, filed on Apr. 23, 2013, under the title "MoCA GATEWAY SPLITTER."

FIELD OF THE INVENTION

The present invention applies broadly to cable television devices, and more specifically to cable television devices associated with receiving a cable television (CATV) signal, and distributing the same to a plurality of devices such as television sets, modems, and Multimedia over Coax Alliance (MoCA) devices, and so forth.

BACKGROUND OF THE INVENTION

Typical cable television (CATV) systems provide for sharing a common coaxial medium relative to CATV signals for permitting various users in the system to communicate with the headend of the system, where the CAN signals originate, but not with each other due to the directionality of signal flow imposed by the requirement that the various users be signal isolated from one another.

In recent years Multimedia over Coax Alliance (MoCA) systems have been developed that operate in a different frequency spectrum or band than CATV systems. MoCA systems are designed to communicate bilaterally with each other, meaning that any port of a MoCA system device serves both an input and output port. MoCA devices are typically located within a home or building for permitting users therein to communicate with a single or dedicated MoCA networking device for permitting each user to selectively record a television program for later viewing. It is important in such MoCA systems to keep the CATV input signals wholly isolated from the MoCA signals within the system. More specifically, one portion of such systems permit typical CATV signals to be connected to individual devices such as television sets, cable boxes, and so forth, in a standard manner, whereby all standard CAN signal ports are isolated from all MoCA ports in the system, as previously mentioned.

The development of what is now typically known as "Cable Gateway Devices" has progressed to providing such devices with the capability to communicate in both the CATV signal band of typically 5 to 1002 MHz, in conjunction with permitting communication by users in the MoCA frequency band that typically is from 1125 MHz to 1675 MHz (megahertz). Accordingly, such Cable Gateway devices permit information that is transmitted through a public CAN system to be shared amongst MoCA device users joined in a private network within a commercial or residential building. Such Cable Gateway devices permit CATV signals to be rebroadcast within a different frequency band via connections controlled through typically digital logic means, completely avoiding the use of physical switching or movement of cables between certain ports.

The present inventors recognize that there is a need in the art for a simplified and cost effective Cable Gateway device that isolates the CATV and MoCA bands, insuring that MoCA band signals cannot become involved with the CATV signals.

SUMMARY OF THE INVENTION

The present invention is a Passive Gateway device that avoids a direct signal path and electrical isolation between a CATV signal input port, and MoCA client or user input/output ports, a function not known to be provided in extended bandwidth conventional splitters. The present inventive device permits users in a building to connect a CATV signal to various TV sets, modems, and so forth, while at the same time permitting bidirectional communication between a plurality of users of individual in-home media devices within a building, each connected through a coaxial cable network terminated at the output ports of the invention and utilizing the RF spectrum allocated to Multimedia over Coax Alliance (MoCA), for example. The dedicated devices for users can be Media Center client devices enabling Multi-room Digital Video Recording (MR-DVR), multi-player gaming, or high-speed data communications. The recording device can be a Gateway recording device, for example.

In one embodiment of the invention providing a Passive Gateway device, two-way splitter means receptive of CATV input signals connects these signals to first and second diplex filters, and to an RF output port for connection of CAN signals to legacy devices such as known cable boxes, television sets, and so forth. The first diplex filter means is for providing a lowpass filter section that cuts off near the high end of the CAN signal band, that is at about 1002 MHz, and a highpass filter section for passing MoCA band signals. The first diplex filter means provides a modem output port for feeding both CAN signals or MoCA band signals from both the lowpass and highpass filter sections thereof. The highpass filter section of the first diplex filter means provides a MoCA signal connection to a resistive splitter means connected to a plurality of MoCA ports. The second diplex filter means also includes a lowpass filter section for passing CATV signals, and a highpass filter section for passing MoCA signals, whereby the highpass and lowpass filter sections provide for connection to a Gateway output port for connecting CAN signals and/or MoCA signals to a Gateway recorder and controller, for example. The highpass filter section of the second diplex filter means provides for the connection of MoCA signals to a plurality of independent MoCA ports via the resistive splitter.

In a second embodiment of the invention, the present invention provides a portion of the first embodiment of the invention for providing users with a CAN connection port, a Gateway port, and a plurality of MoCA ports. More specifically, the second embodiment of the invention includes a 2-way hybrid splitter for receiving a CATV input signal, and splitting off to a CAN port for connection thereto by users, and to a hybrid filter. The hybrid filter provides for an output to a Gateway port, and another output from a highpass section thereof to a resistive splitter. The resistive splitter provides connection to a plurality of MoCA port.

In a third embodiment of the invention, the 2-way hybrid splitter of the second embodiment is eliminated, and a CAN input signal is connected directly to the lowpass filter section of a hybrid filter. An output from the hybrid filter is connected to a Gateway port, and the highpass filter section is again connected to a resistive splitter for permitting bidirectional communication devices connected to a plurality of ports of the resistive splitter.

BRIEF DESCRIPTION OF THE DRAWINGS

Various embodiments of the present invention are described with reference to the drawings, in which like items are identified b y the same reference designation, wherein.

DETAILED DESCRIPTION OF THE INVENTION

Figure 1:
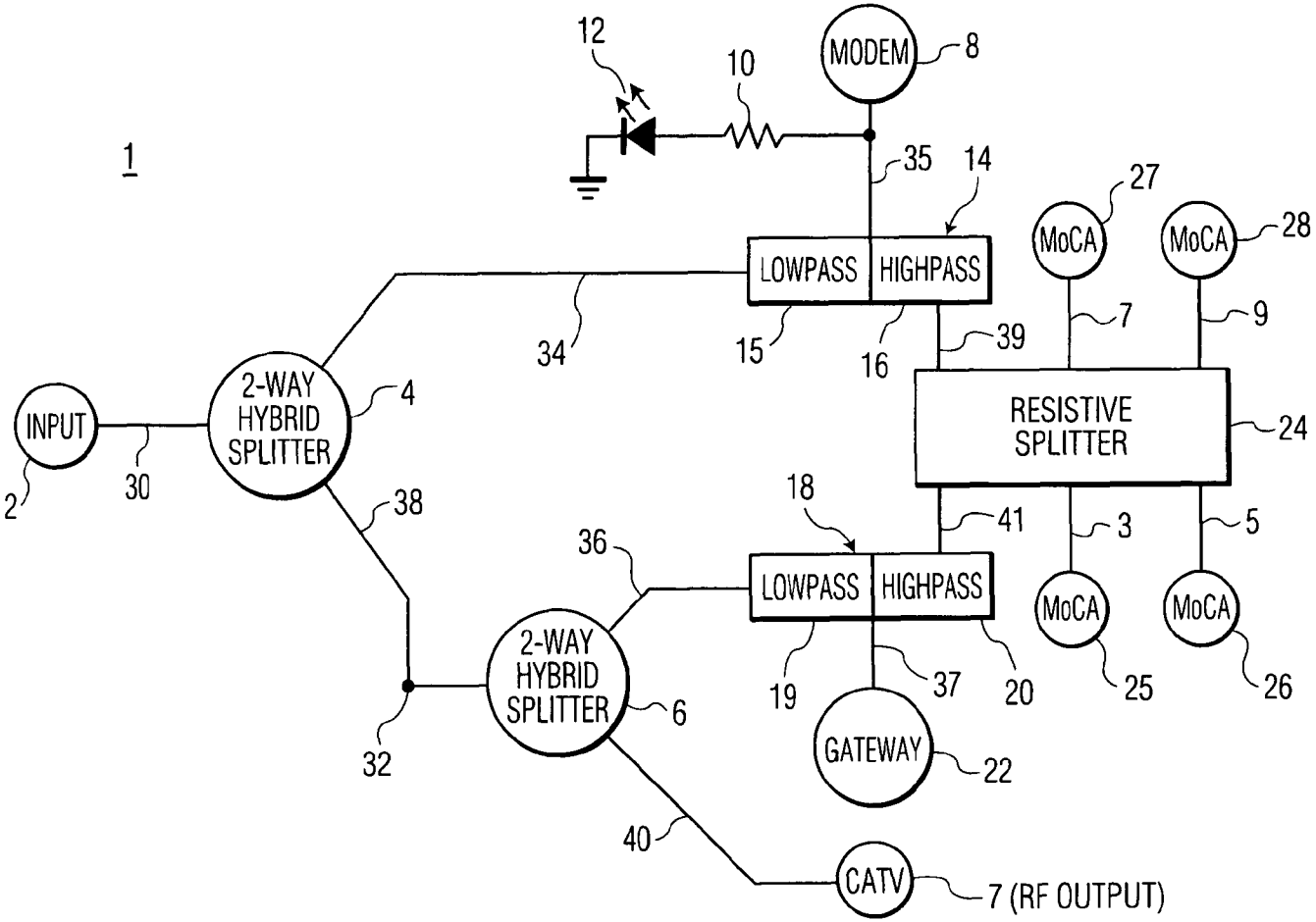
FIG. 1 is a block circuit schematic diagram for one embodiment of the invention.

With reference to FIG. 1, a simplified block diagram of the present CATV MoCA splitter includes an input terminal 2 for receiving a CATV signal typically having a frequency range of 5 MHz to 1002 MHz, and is connected via an electrically conductive line path or lead 30 to the input of a 2-way hybrid splitter 4. The 2-way hybrid splitter 4 has a first output connected via an electrically conducted path 34 to the input of a first diplex filter 14, and a second output connected via an electrically conductive path 38 to an input 32 of a second 2-way hybrid splitter 6. The 2-way hybrid splitter 6 has a first output connected via an electrically conductive path 36 to a second diplex filter 18, and a second output connected via an electrically conductive path 40 to a CATV (RF output) terminal 7. The first diplex filter 14 includes a lowpass filter section 15 for passing CAN signals in the frequency range from 5 MHZ to 1002 MHz for outputting on an electrically conductive path 35 for connection to a modem terminal 8. When a modem (not shown) is connected to the modem terminal 8, typically the modem will provide a voltage feed of 12 volts DC that is connected via electrically conductive path 35 through a resistor 10 (typically 1 k Ω), to a light emitting diode 12, for indicating by its light output connection of a modem to terminal 8. Diplex filter 14 also includes a highpass filter section 16 for passing MoCA signals having a frequency range 1125 MHz to 1675 MHz, for connection via an electrically conductive path 39 to a 6-way resistive splitter 24. The second diplex filter 18 includes a lowpass filter section 19 passing CAN signals having a frequency range of 5 MHZ to 1002 MHz via an electrical conductive path 37 to a Gateway terminal 22. The Gateway terminal 22, in one example, may be connected to a Gateway recording and programmable apparatus (not shown). In this example, indicated CATV signals are passed from the Gateway terminal 22 to the programmable recording apparatus (not shown), MoCA signals having a frequency range of 1125 MHz to 1675 MHz are bidirectionally passed between Gateway terminal 22 and the Gateway recording device (not shown).

MoCA signals, in this example, as previously mentioned, having a frequency range of 1125 MHz to 1675 MHz, are bidirectionally passed between a highpass filter section 16 diplex filter 14 via an electrically conductive pass 39 to a 6-way resistive splitter 24. Similarly, the highpass filter section 20 of diplex filter 18 is connected via an electrically conductive path 41 to bidirectionally pass MoCA signals to the 6-way resistive splitter 24. However, splitter 24 is not meant to be limited to a 6-way resistive splitter, and can be configured to provide any desired number of MoCA ports within practical limits. The 6-way resistive splitter 24 bidirectionally passes MoCA signals via individual electrically conductive paths 3, 5, 7, and 9, to MoCA terminals or ports 25, 26, 27, and 28, respectively. In this example, individual MoCA clients (not shown) can be individually connected to the ports or terminals 25 through 28, respectively, for permitting each of them to program the Gateway device (not shown) to record desired cable television programs for later viewing. The diplex filters 14 and 18 insure that the CATV signals are electrically isolated from the MoCA signals.

Figure 2:
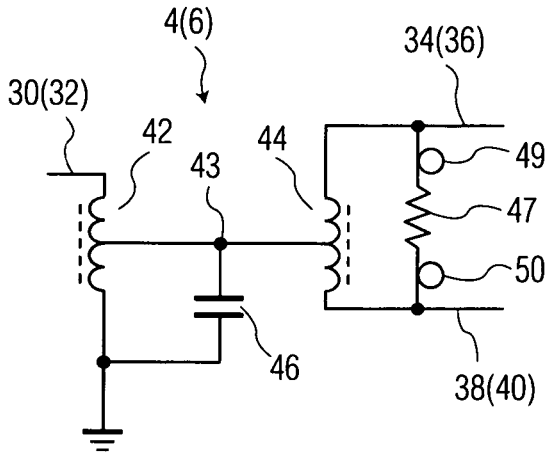
FIG. 2 is a circuit schematic diagram of a 2-way hybrid splitter for an embodiment of the invention.

A typical 2-way hybrid splitter circuit schematic is shown in FIG. 2. In this example, the typical hybrid 2-way splitter 4(6) includes a matching transformer having a primary winding 42 with one end individually connected to an electrically conductive path 30(32), with the other end of the winding 42 being connected to ground. The splitter 4(6) also includes a secondary winding 44 having one end individually connected to electrically conductive paths 34(36), respectively, and another end connected to electrically conductive paths 38(40). In this example, the primary winding 42 has a turns ratio of 2:5 relative to a center tap 43 connected between the primary winding 42 and the secondary winding 44. The secondary winding 44 has a turns ratio of 2:2 relative to the center tap 43. A capacitor 46 is connected between the center tap and ground to match the leakage inductance inherent in the interconnection of the transformer windings 42 and 44. A series circuit of a resistor 47 and two inductors 49 and 50 are connected across the secondary winding 44, as shown. Note that the inductors 49 and 50 are chokes that modify the phase cancellation at the very high end of the frequency band of signals outputted from either of the splitters 14 and 18. The resistor 47, in combination with the chokes 49 and 50 sets the phase cancellation between the two output lines from the secondary winding 44 in order to maximize the electrical isolation therebetween. Note that the value of the capacitor 46 is typically 1 pF (picofarads), the chokes 49 and 50 typically have values of 5 nH (nanohenries), and resistor 47 a value of 200 ohms.

Figure 3:
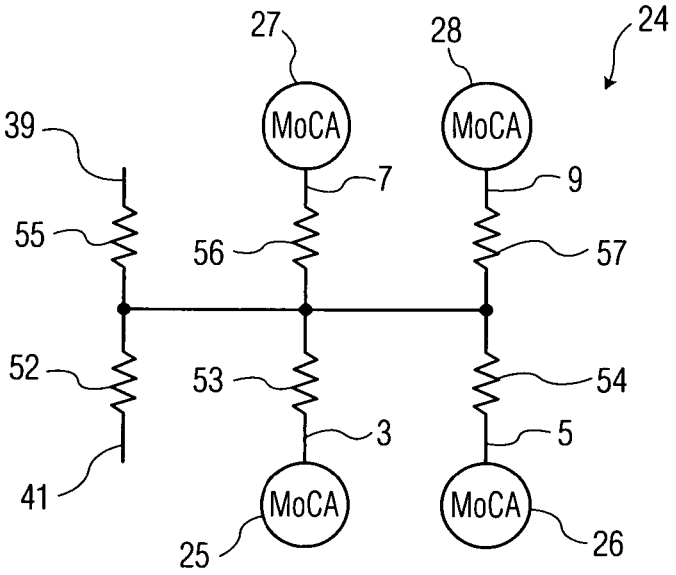
FIG. 3 is a circuit schematic diagram of a resistive splitter used in an embodiment of the invention.

The circuit schematic diagram for a 6-way resistive splitter 24 for an embodiment of the invention is shown in FIG. 3. Six resistors 52 through 57 each have one end connected in common as shown. The other end of resistor 55 is connected to electrically conductive circuit path 39 to the highpass filter section 16 of diplex filter 14. The other end of resistor 52 is connected via electrically conductive path 41 to the highpass filter section 20 of diplex filter 18. The other end of resistor 53 is connected via electrically conductive path 3 to MoCA terminal 25. The other end of resistor 54 is connected via electrically circuit path 5 to MoCA terminal 26. The other end of resistor 56 is connected via electrically conductive path 7 to MoCA terminal 27. The other end of resistor 57 is connected via electrically conductive path 9 to MoCA terminal 28.

Figure 4:
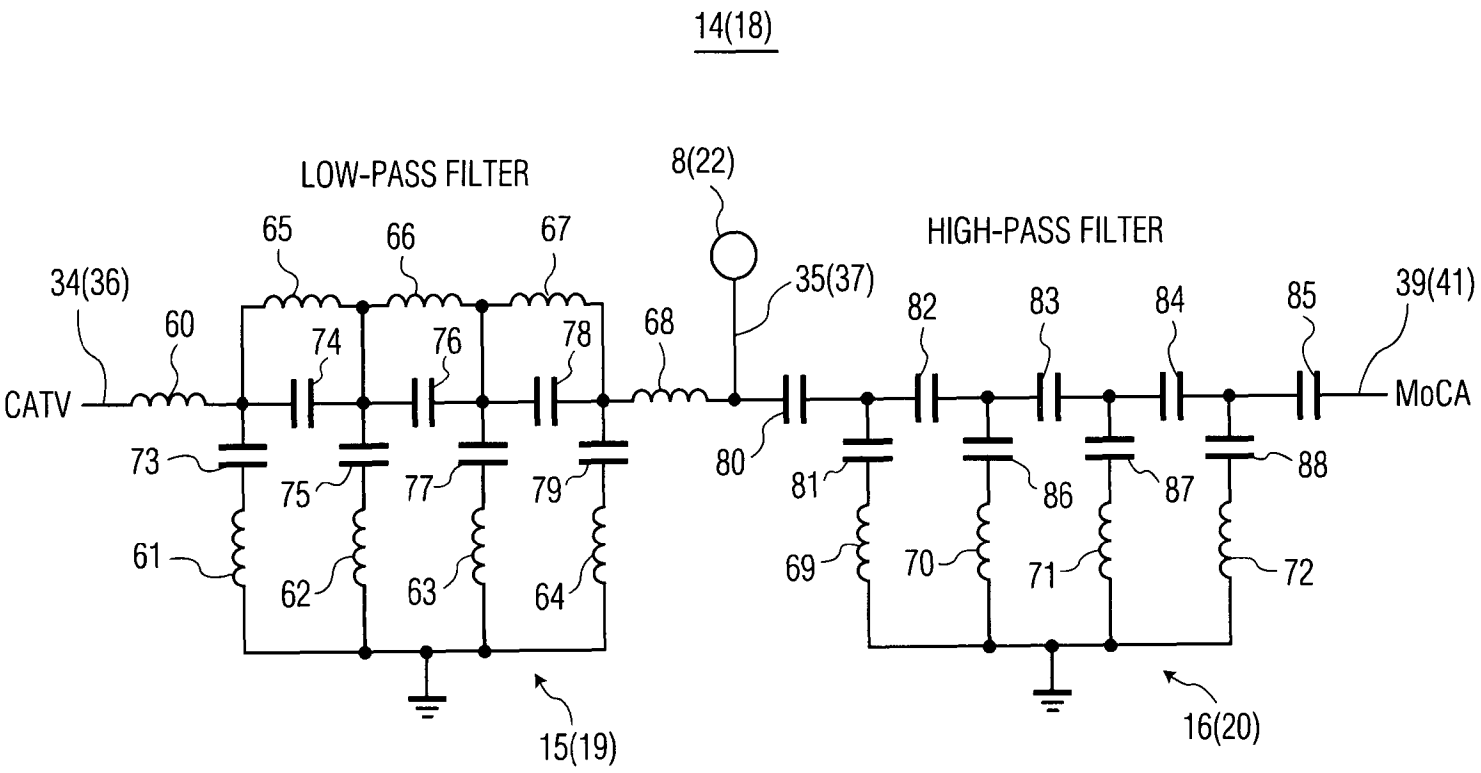
FIG. 4 is a circuit schematic diagram of a diplex filter used in various embodiments of the invention.

A diplex filter circuit schematic diagram, shown in FIG. 4, can be used to provide diplex filters 14, 18, respectively. As shown, each diplex filter 14 (18) includes a plurality of inductors 60 through 72, and a plurality of capacitors 73 through 88, connected in series and parallel circuit combinations, as shown. Values of the aforesaid inductors and capacitors are selected for obtaining the required lowpass filter frequency range, and highpass filter frequency range, as previously indicated.

Figure 5:
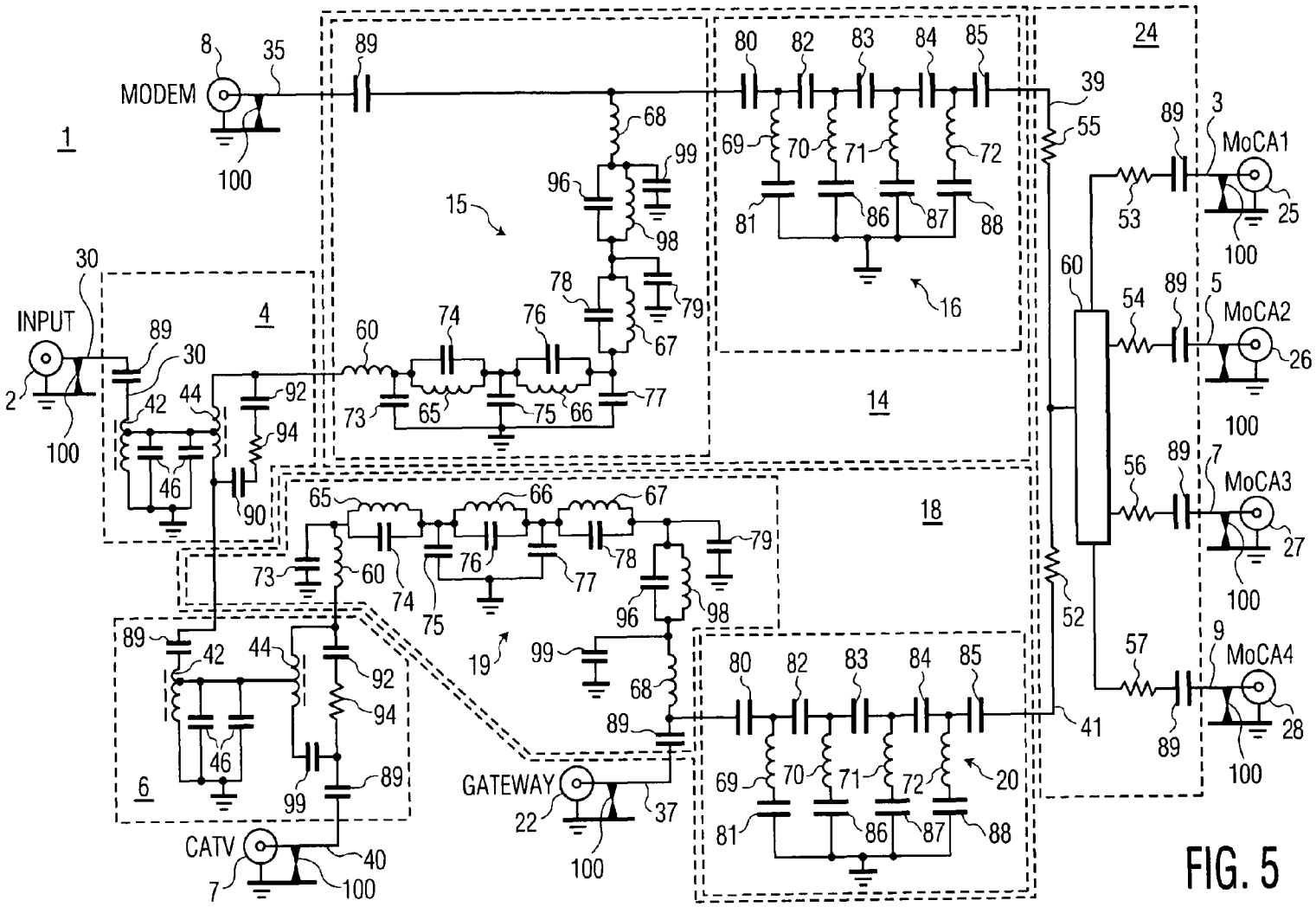
FIG. 5 is a circuit schematic diagram showing circuitry details for a prototype device providing the various necessary functions for an embodiment of the invention.

A circuit schematic diagram for a prototype Gateway splitter developed by the inventors is shown in FIG. 5. As will be explained, the circuitry for the prototype design differs in this embodiment from the previously described embodiments of the invention, whereby additional components have been added. More specifically, spark gaps 100 have been connected individually between input port 2, CATV port 7, modem port 8, Gateway port 22, MoCA port 25, MoCA port 26, MoCA port 27, MoCA port 28, and ground, respectively. Note that use of the terminology port is meant to be also analogous to a terminal, whereby typically each of the aforesaid ports are coaxial connector ports. Also, as shown, DC blocking capacitors 89 have been added to 2-way hybrid splitters 4, 6, diplex filters 14, 18, and the 6-way resistive splitter 24, each of the blocking capacitors 89 being connected as shown. Each of the 2-way hybrid splitters 4 and 6 include two matching capacitors in parallel between the tap offs from primary winding 42 and secondary winding 44 and ground, as shown. The lowpass filter sections 15 and 19 of diplex filters 14, 18, respectively, now each further include additional capacitors 96 and 99, and a choke for inductance 98, as shown. The highpass filter sections 16 and 20 of the diplex filters 14, 18, respectively, remain identical to the circuitry previously shown in FIG. 4. Also note that in the 6-way resistive splitter 24, a connection pad 60 has been included in order to provide a common connection node for all of the resistors of the resistive splitter 24. Pad 60 is large enough to provide a low impedance node via the copper material of the pad providing body capacitance on a dielectric PC Board substrate. If MoCA ports 25 through 28 are all terminated to MoCA device ports each having a 75 ohm input impedance, the characteristic impedance at pad or node 60 will be 21.5 ohms. In this example, as is typical with CATV systems, the impedance at the various ports is 70 ohms.

In the 2-way hybrid splitters 4 and 6, the reason that two capacitors 46 are used in parallel between the ferrite transformer windings 42 and 44 is to obtain a more distributed ground connection. The capacitors 46 provide for canceling small amounts of stray inductance in the interconnection between the ferrite core transformers 42 and 44, for improving high frequency return loss and isolation therebetween. Note further that in the prototype the resistor 94 of the 2-way hybrid splitters 4 and 6 have a value 180 ohms, but can have a resistance range of 150 ohms to 220 ohms depending on the characteristics of the particular ferrite core transformers 42, 44, at low frequencies between 5 MHz and 50 MHz. Note further that resistors 94 are connected in series with an inductor (not shown) that is printed on an associated printed circuit board rather than being a discrete component, with the series circuit thereof being connected therebetween capacitors 90 and 92. Capacitors 90 and 92 improve isolation and return loss at low frequencies.

With further reference to the diplex filters 14 and 18, as shown in FIG. 5, note that the lowpass filter sections 15 and 19 thereof, respectively, differ from the circuitry of FIG. 4. More specifically, in the prototype circuitry four parallel tank circuits are included in the associated lowpass filter sections 15 and 19, rather than three as shown in FIG. 4. The additional parallel tank circuit in each section includes capacitors 96 and 99, and inductor 98, for further insuring a frequency roll off above 1.0 GHz, thereby avoiding adding additional inductors to every shunt element.

With further reference to the prototype circuit schematic diagram of FIG. 5, values of various of the components utilized will now be given, but are not meant to be limiting. The DC blocking capacitors 89 each have a value of 2200 (picofarads), and a voltage rating of 50 volts in this example.

In the 2-way hybrid splitter circuits 4 and 6, the tapoff 43 for the ferrite core transformer 42 is between the second turn and the fifth turn of the seven turns thereof, whereas in the ferrite core transformer 44 the tapoff 43 is between the second turn from each end of the four turns included. The capacitors 90 each have a value of 1000 pf. Capacitors 92 each have a value of 1000 pf. Capacitors 46 each have a value of 1 pf.

For diplex filters 14 and 18, the inductances 60 each have a 0.3 mm (millimeter) wire diameter, a 1.5 mm coil diameter, and 2.5 turns. Capacitors 73 each have a value of 2.0 pf. Capacitors 74, 78, and 96 each have a value of 0.75 pf. The inductances 65, 66, 67, and 98 each have a 0.3 mm wire diameter, 1.7 mm coil diameter, and 2.5 turns, respectively. Capacitors 75 each have a value of 1.8 pf. The capacitors 77 and 79 each have a value of 1.8 pf. Capacitor 99 has a value of 2.2 pf. Inductor 68 has a 0.3 mm wire diameter, a 2.0 mm coil diameter, and 2.5 turns. Capacitor 99 has a value of 2.2 pf. In the highpass filter sections 16 and 20 of diplex filters 14, 18, respectively, capacitor 80 has a value of 1.2 pf. Capacitors 82, 86, and 87 each has a value of 1.8 pf, respectively. Capacitor 81 has a value of 2.2 pf. Capacitor 83 has a value of 2.0 pf. Capacitor 84 has a value of 1.5 pf. Capacitor 85 has a value of 6.8 pf. Capacitor 88 has a value of 2.5 pf. Inductor 69 has a 0.3 mm wire diameter, a 1.5 mm coil diameter, and 2.5 turns. Inductors 70, 71 and 72 each have a 0.3 mm wire diameter, a 1.7 mm coil diameter, and 2.5 turns, in this example. In the 6-way resistive splitter 24, each of the resistors 52 through 57, respectively, has a value of 54 ohms, in this example. Note that none of the component values used in the prototype as given above are meant to be limiting.

Figure 6:
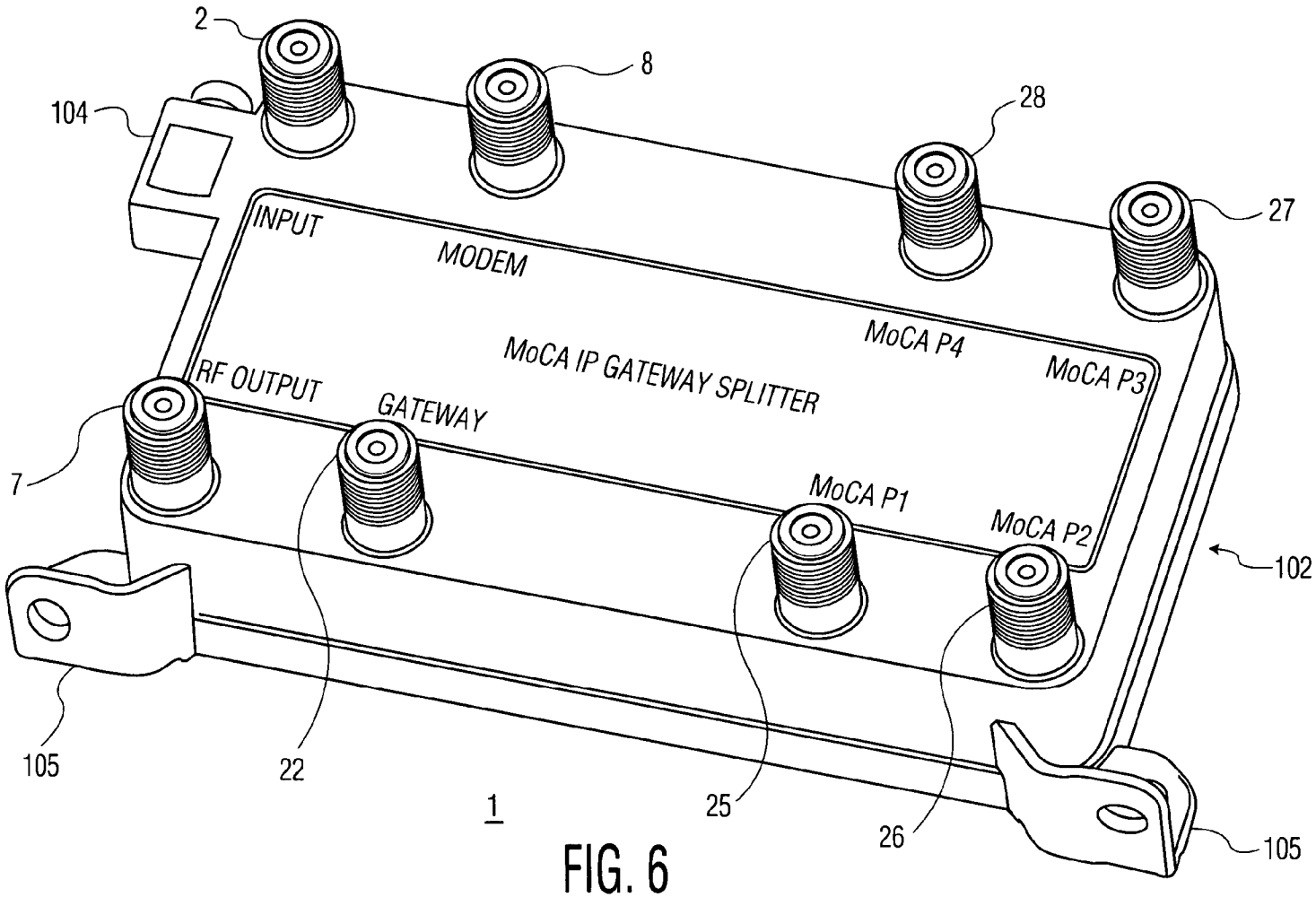
FIG. 6 is a top view of a "MoCA Gateway splitter" prototype housing developed by the inventors for an embodiment of the invention.

In FIG. 6, a housing 102 for a Gateway prototype splitter 1 is shown. The MoCA ports 25 through 28 are located at one end of the associated housing 102, whereas the input port 2, modem port 8, RF output port 7, and Gateway port 22 are located at an opposite end of the housing 102. Also shown is a terminal 104 for receiving a ground connection. Screw receptive brackets 105 are provided for securing the Gateway splitter to a desired seating surface, such as a mounting base within a cavity or enclosure (not shown).

Figure 7:
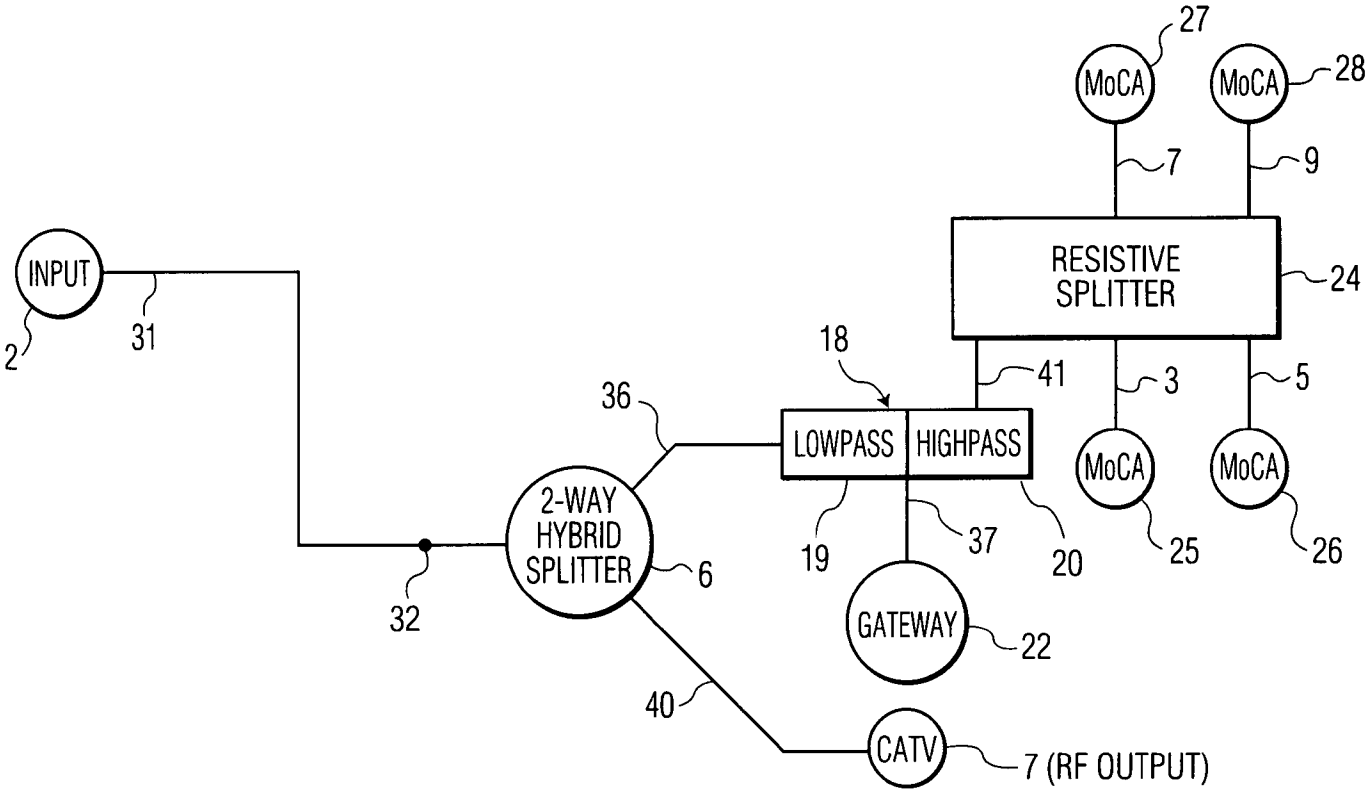
FIGS. 7 and 8 are block circuit schematic diagrams for second and third embodiments of the invention, respectively.

In the second embodiment of the invention, as shown in FIG. 7, an input port 2 for receiving a CATV signal is connected via electrically conductive line path 31 to an input 32 of the 2-way hybrid splitter 6. The 2-way hybrid splitter 6 outputs are connected as in the embodiment of FIG. 1 to the lowpass section 19 of a diplex filter 18, and the CATV port 7. Further, as with the embodiment of FIG. 1, the diplex filter 18 has a connection to a Gateway port 22, and to a resistive splitter 24, as shown. Relative to the first embodiment of the invention of FIG. 1, in the second embodiment the 2-way hybrid splitter 4, diplex filter 14, modem port 8, resistor 10, and LED 12 have been removed.

Figure 8:
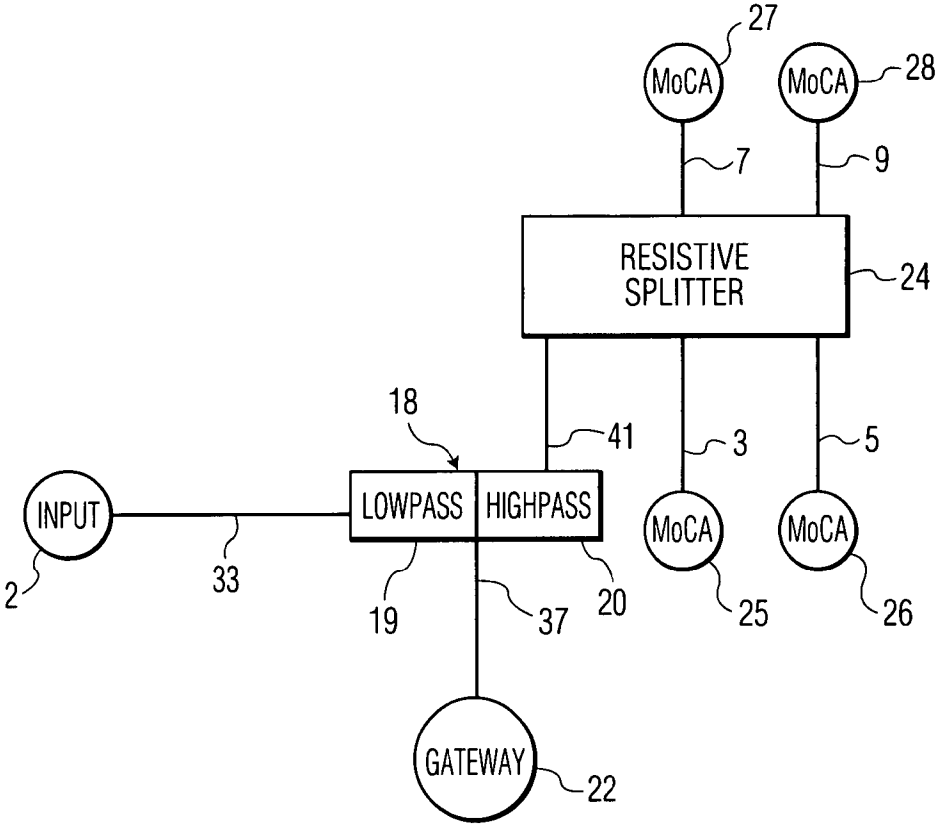

A third embodiment of the invention is shown in FIG. 8. In the third embodiment an input port 2 for receiving a CATV signal provides for connection thereof via an electrical lead line or conductive path 33 directly to the lowpass section 19 diplex filter 18. In comparison to the second embodiment of the invention of FIG. 7, in the third embodiment the 2-way hybrid splitter 6 has been eliminated, which in turn eliminates the provision of a CATV port 7, as in the other embodiments. Accordingly, relative to embodiment of FIG. 1, the embodiment of FIG. 7 eliminates the provision of allowing a user to connect a modem, but otherwise retains all of the other connections of the first embodiment. The third embodiment of the invention relative to the second embodiment eliminates the provision of a CATV port 7, and only provides for a user to have use of MoCA ports, and a Gateway port. Note further that as shown, the resistive splitter 24 of FIG. 1 is a 6-way splitter, whereas the resistive splitter 24 of the second and third embodiments of FIGS. 7 and 8 is a 5-way resistive splitter. However, it should be understood that the resistive splitter 24 can be configured to provide any number of MoCA ports within practical limits.

Although various embodiments of the invention have been shown and described, they are not meant to be limiting. Those of skill in the art may recognize certain modifications to these embodiments, which modifications are meant to be covered by the spirit and scope of the appended claims.

What is claimed is:

[1. A passive Gateway splitter device comprising:

an input port for receiving a CATV input signal;

an RF/CATV output terminal;

a modem port;

a Gateway port for connection to a Gateway device;

a MoCA splitter comprising a first input, a second input, and a plurality of ports configured for being connected to a plurality of MoCA devices associated with a plurality of MoCA clients, the plurality of ports further configured for passing MoCA signals, each of the plurality of ports configured for passing one of the MoCA signals from or to a connected one of the plurality of MoCA devices associated with a respective one of the plurality of MoCA clients;

a first two-way splitter comprising an input connected to said input port, the first two-way splitter further comprising a first output and a second output, the first two-way splitter configured for receiving the CATV input signal via the input of the two-way splitter and splitting the CATV input signal into a first CATV signal output via the first output and a second CATV signal output via the second output;

a second two-way splitter comprising an input connected to the second output of the first two-way splitter, the second two-way splitter further comprising a first output and a second output, the second two-way splitter configured for receiving the second CATV signal via the input of the second two-way splitter and splitting the second CATV signal into a third CATV signal output via the first output of the second two-way splitter and a fourth CATV signal output via the second output of the second two-way splitter, the second output of the second two-way splitter connected to said RF/CATV output terminal;

a first diplex filter comprising an input connected to the first output of the first two-way splitter for receiving the first CATV signal via the first output of the first two-way splitter, the first diplex filter further comprising a first output connected to the modem port and a second output connected to the first input of the MoCA splitter, the first diplex splitter configured for electrically isolating said first CATV signal from said MoCA signals to prevent the MoCA signals from being connected to said input port of the first diplex filter, and for individually bidirectionally connecting the first CATV signal and the MoCA signals to said modem port;

a second diplex filter comprising an input connected to the first output of the second two-way splitter for receiving the third CATV signal via the first output of the second two-way splitter, the second diplex filter further comprising a first output connected to the Gateway port and a second output connected to the second input of the MoCA splitter, the second diplex splitter configured for electrically isolating said third CATV signal from said MoCA signals to prevent the MoCA signals from being connected to said input port of the second diplex filter, and for individually bidirectionally connecting the fourth CATV signal and the MoCA signals to said Gateway port, wherein the Gateway port provides the MoCA clients associated with the MoCA devices connected to the plurality of ports of the MoCA splitter the ability to program said Gateway device to record their respective desired CATV programs for later viewing.]

[2. The device of claim 1, wherein:

the first diplex filter comprises a lowpass filter section for receiving said first CATV signal, and a highpass filter section for bidirectionally receiving the MoCA signals from said MoCA splitter, the first diplex filter configured for connecting said first CATV signal and the MoCA signals to said modem port, while electrically isolating said MoCA signals both from said first two-way splitter, and from said input port of the passive Gateway splitter device; and the second diplex filter comprises a lowpass filter section for receiving said third CATV signal, and a highpass filter section for bidirectionally receiving the MoCA signals from said MoCA splitter, the second filter configured for connecting said third CATV signal and the MoCA signals to said Gateway port, while electrically isolating said MoCA signals both from said second two-way splitter and from said input port of the passive Gateway splitter device.]

[3. The device of claim 1, wherein said MoCA splitter further comprises:

a resistive splitter including a plurality of resistors each having one end connected in common, wherein other ends of said plurality of resistors are individually connected to said plurality of ports of the MoCA splitter, respectively, and individually connected to either the first diplex filter or the second diplex filter.]

[4. The device of claim 1, wherein said MoCA splitter further comprises:

a resistive splitter including a plurality of resistors each having one end connected in common, wherein other ends of said plurality of resistors are individually connected to said plurality of ports of the MoCA splitter, respectively, and individually connected to the highpass filter sections of either of said first and second diplex filters.]

[5. The device of claim 2, wherein said MoCA splitter further comprises;

a resistive splitter including a plurality of resistors each having one end connected in common, wherein other ends of said plurality of resistors are individually connected to said plurality of ports of the MoCA splitter, respectively, and individually connected to the highpass filter sections of either of said first and second diplex filters.]

[6. The device of claim 1, wherein said MoCA splitter further comprises:

an electrically conductive connection pad; and a plurality of resistors, two of which have one end connected in common to said connection pad, wherein other ends of said plurality of resistors are individually connected to either of said first and second diplex filter, the remainder of said plurality of resistors each being individually connected between said connection pad, and the plurality of ports of the MoCA splitter, respectively.]

[7. The device of claim 1, wherein said MoCA splitter further comprises:

an electrically conductive connection pad;

a plurality of resistors, two of which have one end connected in common to said connection pad, wherein other ends of said plurality of resistors are individually connected to the highpass filter sections of said first and second diplex filters, respectively, the remainder of said plurality of resistors each being individually connected between said connection pad, and the plurality of ports of the MoCA splitter.]

[8. The device of claim 2, wherein said MoCA splitter further comprises:

an electrically conductive connection pad;

a plurality of resistors, two of which have one end connected in common to said connection pad, wherein other ends of said plurality of resistors are individually connected to the highpass filter sections of said first and second diplex filters, respectively, the remainder of said plurality of resistors each being individually connected between said connection pad, and the plurality of ports of the MoCA splitter, respectively.]

[9. The device claim 1, wherein said first and second 2-way splitters each consist of hybrid splitter configurations.]

[10. A CATV/MoCA passive signal distribution system comprising:

an input port for receiving a CATV input signal;

an RF/CATV output terminal;

a modem port;

a Gateway device receptive of CATV and MoCA signals;

a Gateway port for connection to said Gateway device;

a MoCA splitter comprising a first input, a second input, and a plurality of ports configured for passing MoCA signals, each of the plurality of ports configured for passing one of the MoCA signals from or to a connected MoCA device associated with a MoCA client;

a first two-way splitter comprising an input connected to said input port, the first two-way splitter further comprising a first output and a second output, the first two-way splitter configured for receiving the CATV input signal via the input of the two-way splitter and splitting the CATV input signal into a first CATV signal output via the first output and a second CATV signal output via the second output;

a second two-way splitter comprising an input connected to the second output of the first two-way splitter, the second two-way splitter further comprising a first output and a second output, the second two-way splitter configured for receiving the second CATV signal via the input of the second two-way splitter and splitting the second CATV signal into a third CATV signal output via the first output of the second two-way splitter and a fourth CATV signal output via the second output of the second two-way splitter, the second output of the second two-way splitter connected to said RF/CATV output terminal;

a first diplex filter comprising an input connected to the first output of the first two-way splitter for receiving the first CATV signal via the first output of the first two-way splitter, the first diplex filter further comprising a first output connected to the modem port and a second output connected to the first input of the MoCA splitter, the first diplex splitter configured for electrically isolating said first CATV signal from said MoCA signals to prevent the MoCA signals from being connected to said input port of the first diplex filter, and for individually bidirectionally connecting the first CATV signal and the MoCA signals to said modem port;

a second diplex filter comprising an input connected to the first output of the second two-way splitter for receiving the third CATV signal via the first output of the second two-way splitter, the second diplex filter further comprising a first output connected to the Gateway port and a second output connected to the second input of the MoCA splitter, the second diplex splitter configured for electrically isolating said third CATV signal from said MoCA signals to prevent the MoCA signals from being connected to said input port of the second diplex filter, and for individually bidirectionally connecting the fourth CATV signals and the MoCA signals to Gateway port;

a plurality of individual MoCA devices associated with a plurality of MoCA clients, respectively, and connected to the plurality of ports of the MoCA splitter, and wherein the Gateway port provides the MoCA clients associated with the MoCA devices connected to the plurality of ports of the MoCA splitter the ability to program said Gateway device to record their respective desired CATV programs for later viewing.]

[11. The system of claim 10, wherein:

the first diplex filter comprises a lowpass filter section for receiving said first CATV signal, and a highpass filter section for bidirectionally receiving the MoCA signals from said MoCA splitter, the first diplex filter configured for connecting said first CATV signal and the MoCA signals to said modem port, while electrically isolating said MoCA signals both from said first two-way splitter and from said input port of the passive Gateway splitter; and the second diplex filter comprises a lowpass filter section for receiving said third CATV signal, and a highpass filter section for bidirectionally receiving the MoCA signals from said MoCA splitter, the second diplex filter configured for connecting said third CATV signal and the MoCA signals to said Gateway port, while electrically isolating said MoCA signals both from said second two-way splitter means, and from said input port of the passive Gateway splitter.]

[12. The system of claim 10, wherein said MoCA splitter further comprises:

a resistive splitter including a plurality of resistors each having one end connected in common, wherein other ends of said plurality of resistors are individually connected to said plurality of ports of the MoCA splitter, respectively, and individually connected to either the first diplex filter or the second diplex filter.]

[13. The system of claim 10, wherein said MoCA splitter further comprises:

a resistive splitter including a plurality of resistors each having one end connected in common, wherein other ends of said plurality of resistors are individually connected to said plurality of ports of the MoCA splitter, respectively, and individually connected to the highpass filter sections of either of said first and second diplex filters.]

[14. The system of claim 10, wherein said MoCA splitter further comprises:

a resistive splitter including a plurality of resistors each having one end connected in common, wherein other ends of said plurality of resistors are individually connected to said plurality of ports of the MoCA splitter, respectively, and individually connected to the highpass filter sections of said first and second diplex filters.]

[15. The system of claim 10, wherein said MoCA splitter further comprises:

an electrically conductive connection pad; and a plurality of resistors, two of which have one end connected in common to said connection pad, wherein other ends of said plurality of resistors are individually connected to either of said first and second diplex filter, the remainder of said plurality o f resistors each being individually connected between said connection pad, and the plurality of the ports of the MoCA splitter, respectively.]

*16. A method of making a passive Gateway splitter device the method comprising:*

*electrically connecting a lowpass filter section and a highpass filter section of a diplex filter having a first direct current (DC) blocking capacitor to a Gateway port that is connectable to a Gateway device via the first DC blocking capacitor;*

*electrically connecting the Gateway port to a first surge protection device configured to protect the passive Gateway splitter device from surges;*

*electrically connecting the lowpass filter section to an input port for receiving a CATV (cable television) input signal via a second DC blocking capacitor, enabling any Gateway device connected to the Gateway port to communicate with the input port via the lowpass filter section in a lower frequency band having a frequency range that is lower than a higher frequency band;*

*electrically connecting the input port to a second surge protection device configured to protect the passive Gateway splitter device from surges;*

*electrically connecting the highpass filter section to a MoCA (Multimedia over Coax Alliance) splitter having a plurality of DC blocking capacitors and electrically connecting the MoCA splitter to each of a plurality of MoCA ports via a respective DC blocking capacitor of the plurality of DC blocking capacitors, enabling any MoCA device connected to one of the plurality of MoCA ports to communicate with the Gateway port via the highpass filter section in the higher frequency band; and*

*electrically connecting each MoCA port to a respective surge protection device configured to protect the passive Gateway splitter device from surges;*

*wherein the passive Gateway splitter device provides only one signal path from the input port to the MoCA splitter and the lowpass filter section and the highpass filter section of the diplex filter isolate each of the plurality of MoCA ports from the input port.*

*17. The method of claim 16, wherein the diplex filter is the only diplex filter along the single signal path between the input port and the Gateway port.*

*18. The method of claim 16, wherein the diplex filter is the only diplex filter along the single signal path between the input port and the MoCA splitter.*

*19. The method of claim 16, wherein the diplex filter is the only diplex filter along the single signal path between the Gateway port and the MoCA splitter.*

*20. The method of claim 16, further comprising:*

*attaching the input port to a housing;*

*attaching the Gateway port to the housing;*

*attaching the plurality of MoCA ports to the housing; and*

*enclosing the diplex filter inside the housing, wherein the diplex filter is the only diplex filter inside the housing.*

*21. The method of claim 16, wherein the first surge protection device is a first spark gap electrically connected between the Gateway port and ground, the second surge protection device is a second spark gap electrically connected between the input port and ground, and each respective surge protection device is each a respective spark gap electrically connected between one of the plurality of MoCA ports and ground.*

*22. The method of claim 16, wherein the MoCA splitter is a resistive splitter.*

*23. The method of claim 16, wherein the MoCA splitter enables any two MoCA devices connected to any two of the plurality of MoCA ports to bidirectionally communicate via the MoCA splitter.*

*24. The method of claim 16, further comprising:*

*electrically connecting a two-way hybrid splitter between the input port and the lowpass filter section, the two-way hybrid splitter including a third DC blocking capacitor;*

*electrically connecting the two-way hybrid splitter to a CATV output port via the third DC blocking capacitor; and*

*electrically connecting the CATV output port to a third surge protection device configured to protect the passive Gateway splitter device from surges.*

*25. The method of claim 24, further comprising:*

*attaching the input port to a housing;*

*attaching the Gateway port to the housing;*

*attaching the plurality of MoCA ports to the housing;*

*attaching the CATV output port to the housing; and*

*enclosing the diplex filter inside the housing, wherein the diplex filter is the only diplex filter inside the housing.*

*26. The method of claim 24, wherein the diplex filter is the only diplex filter along the single signal path between the CATV output port and the MoCA splitter.*

*27. The method of claim 24, wherein the first surge protection device is a first spark gap electrically connected between the Gateway port and ground, the second surge protection device is a second spark gap electrically connected between the input port and ground, the third surge protection device is a third spark gap electrically connected between the CATV output port and ground, and each respective surge protection device is each a respective spark gap electrically connected between one of the plurality of MoCA ports and ground.*

*28. A method of distributing a CATV (cable television) input signal and MoCA (Multimedia over Coax Alliance) signals with a passive Gateway splitter device, the method comprising:*

*receiving the CATV input signal by an input port that is electrically connected to a first surge protection device configured to protect the passive Gateway splitter device from surges;*

*providing the CATV input signal, via a first direct current (DC) blocking capacitor, to a lowpass filter section of a diplex filter having a second DC blocking capacitor;*

*lowpass filtering the CATV input signal by the lowpass filter section of the diplex filter;*

*providing the lowpass filtered CATV input signal, via the second DC blocking capacitor, to a Gateway port that is connectable to a Gateway device and is electrically connected to a second surge protection device configured to protect the passive Gateway splitter device from surges;*

*receiving MoCA signals by a plurality of MoCA ports that are each electrically connected to a respective surge protection device configured to protect the passive Gateway splitter device from surges;*

*providing each MoCA signal to a MoCA splitter having a plurality of DC blocking capacitors via one of the plurality of DC blocking capacitors;*

*highpass filtering the MoCA signals by the highpass filter section of the diplex filter; and*

*providing the highpass filtered MoCA signals to the Gateway port via the second DC blocking capacitor,*

*wherein only one signal path is provided from the input port to the MoCA splitter and lowpass filtering the CATV input signal and highpass filtering the MoCA signals electrically isolates the input port from each of the plurality of MoCA ports.*

*29. The method of claim 28, wherein the diplex filter is the only diplex filter along the single signal path between the input port and the Gateway port.*

*30. The method of claim 28, wherein the diplex filter is the only diplex filter along the single signal path between the input port and the MoCA splitter.*

*31. The method of claim 28, wherein the diplex filter is the only diplex filter along the single signal path between the Gateway port and the MoCA splitter.*

*32. The method of claim 28, wherein:*

*the input port is attached to a housing;*

*the Gateway port is attached to the housing;*

*the plurality of MoCA ports is attached to the housing; and*

*the diplex filter is the only diplex filter enclosed inside the housing.*

*33. The method of claim 28, wherein the first surge protection device is a first spark gap electrically connected between the input port and ground, the second surge protection device is a second spark gap electrically connected between the Gateway port and ground, and each respective surge protection device is each a respective spark gap electrically connected between one of the plurality of MoCA ports and ground.*

*34. The method of claim 28, wherein the MoCA splitter is a resistive splitter.*

*35. The method of claim 28, further comprising:*

*distributing the MoCA signals received from each of the plurality of MoCA ports to another of the plurality of MoCA ports.*

*36. The method of claim 28, further comprising:*

*splitting the CATV signal by a two-way hybrid splitter between the input port and the lowpass filter section, the two-way hybrid splitter including a third DC blocking capacitor;*

*providing the CATV signal to a CATV output port that is electrically connected to a third surge protection device by the two-way hybrid splitter via the third DC blocking capacitor, the third surge protection device being configured to protect the passive Gateway splitter device from surges.*

*37. The method of claim 36, wherein:*

*the input port is attached to a housing;*

*the Gateway port is attached to the housing;*

*the plurality of MoCA ports are attached to the housing;*

*the CATV output port is attached to the housing;*

*the diplex filter is enclosed inside the housing; and*

*the diplex filter is the only diplex filter inside the housing.*

*38. The method of claim 36, wherein the diplex filter is the only diplex filter along the single signal path between the CATV output port and the MoCA splitter.*

*39. The method of claim 37, wherein the first surge protection device is a first spark gap electrically connected between the input port and ground, the second surge protection device is a first spark gap electrically connected between the Gateway port and ground, the third surge protection device is a third spark gap electrically connected between the CATV output port and ground, and each respective surge protection device is each a respective spark gap electrically connected between one of the plurality of MoCA ports and ground.*

* * * * *